United States Patent
Suzuki

[11] Patent Number: 6,072,916
[45] Date of Patent: Jun. 6, 2000

[54] HIGH SPEED PIPELINE IMAGE PROCESSING FOR DIGITAL PHOTOPRINTER

[75] Inventor: Ryo Suzuki, Kanagawa, Japan

[73] Assignee: Fuji Photo Film Co., Ltd., Kanagawa, Japan

[21] Appl. No.: 08/932,169

[22] Filed: Sep. 17, 1997

[30] Foreign Application Priority Data

Sep. 18, 1996 [JP] Japan ................................. 8-245882

[51] Int. Cl.[7] ........................................... G06K 9/54
[52] U.S. Cl. ........................ 382/303; 382/254; 382/276; 358/296; 358/448
[58] Field of Search ........................... 382/254, 302–304, 382/276, 299, 295, 307; 358/296, 302, 444, 451–455, 458, 426, 518–521, 461, 448; 348/580–583; 355/35, 77, 69; 345/4, 31, 433, 439; 700/2, 4, 11

[56] References Cited

U.S. PATENT DOCUMENTS

| | | | |
|---|---|---|---|
| 4,309,691 | 1/1982 | Castleman | 382/303 |
| 4,633,503 | 12/1986 | Hinman | 382/295 |
| 5,022,090 | 6/1991 | Masaki et al. | 382/303 |
| 5,189,529 | 2/1993 | Ishiwata et al. | 358/451 |
| 5,585,879 | 12/1996 | Tahara et al. | 396/570 |
| 5,784,149 | 7/1998 | Kawaoka | 355/35 |
| 5,799,111 | 8/1998 | Guissin | 382/254 |

*Primary Examiner*—Leo H Boudreau
*Assistant Examiner*—Ishrat Sherali

[57] ABSTRACT

An image processing apparatus subjects image data photoelectrically read out by an image reading apparatus to predetermined image processings and outputs the read-out image data as image data to be recorded. The image processing apparatus includes a plurality of memories for storing image data read out by the image reading apparatus; an image processing unit for reading the image data from the memories and for carrying out the predetermined image processings by pipeline processing; a condition setting unit for setting image processing conditions in the image processing unit; an image data bus for inputting and outputting the image data; and a control bus for inputting and outputting control data. The image processing apparatus permits a scanner to continuously read images, and a printer to continuously record the images of an application requiring high speed output of finished prints (i.e., a digital photoprinter). Thus, finished prints can be effectively output at high speed.

19 Claims, 2 Drawing Sheets

HIGH SPEED PIPELINE IMAGE PROCESSING FOR DIGITAL PHOTOPRINTER

BACKGROUND OF THE INVENTION

1. Field of the Invention

The present invention relates to an image processing apparatus for processing image data read by an image reading apparatus. More specifically, the invention relates to an image processing apparatus capable of carrying out high speed processing, the apparatus being preferably used in a digital photoprinter and the like which continuously outputs finished prints by continuously reading original images.

2. Description of the Related Art

At present, an image recorded on a photographic film such as a negative film, a reversal film and the like (hereinafter referred to as a film) is printed to a photosensitive material such as a photographic paper and the like by so-called direct exposure which subjects the photosensitive material to conventional areal exposure by projecting an image recorded on a film.

Recently, printers using digital exposure (i.e., digital photoprinters) have been developed and put to practical use. In the digital photoprinters, after image information which has been recorded on a film is photoelectrically read out, the read-out image information is converted as digital image data to be recorded by being subjected to various kinds of image processing. Then, a photosensitive material is scanned with and exposed to recording light modulated in accordance with the image data to thereby record an image (a latent image). The recorded image is developed and a resultant photographic print is obtained.

In the digital photoprinters, since a film is photoelectrically read out and exposure conditions are determined after a color/density correction is performed by signal processing, the period of time during which a single image is exposed is short and the exposure time is fixed with respect to image size. As a result, printing can be carried out faster as compared with the conventional areal exposure.

Editing such as combining of a plurality of images, division of an image and the like, and image processing such as color/density adjustment and the like, can be carried out freely. Therefore, finished prints edited and processed freely in accordance with their use can be output. Since the recorded images on finished prints can be stored in a recording medium such as a MO (magneto optical recording medium) and the like as image data, it is not necessary to prepare a film serving as an original image to make additional prints. Further, since it is not necessary to determine exposure conditions again, a job can be promptly and simply carried out.

In prints made by conventional direct exposure, the images recorded on film cannot be perfectly reproduced to resolution, color/density reproducibility and the like. However, with digital photoprinters, recorded prints can be reproduced and output with near perfect accuracy.

Basically, the digital photoprinters comprise an image reading apparatus (scanner), an image processing apparatus (image processor), and an image recording apparatus (printer).

In the scanner, reading light produced by a light source impinges upon a film to thereby obtain the projected light which carries an image recorded on the film. The image carried by the projected light is formed on an image sensor such as a CCD (charge coupled device) sensor or the like through an image forming lens, and read out by subjecting the projected light to photoelectrical conversion in the image sensor. Then, after various kinds of necessary image processing, the image is input to the image processing apparatus as image data (information) on a film.

The image processing apparatus sets image processing conditions in accordance with the image data having been transferred from the scanner and displays an image which was processed in accordance with previously set conditions. After the operator carries out testing and adjusts the image processing conditions, the image data are subjected to a determined image processing and input to the printer as output image data (exposure conditions) for recording the image.

Where the printer is an apparatus which makes use of a light beam scanning exposure, light beams are modulated in accordance with the image data input from the image processing apparatus and deflected in a main scanning direction. Also, the photosensitive material (photographic paper) is conveyed in an auxiliary scanning direction, which is normal to the main scanning direction. In this manner, the photosensitive material is two-dimensionally exposed to (or printed by) the light beams carrying an image to thereby form a latent image. The photosensitive material is then subjected to development processing in accordance with the photosensitive material. Finally, a finished print (photograph) is thereby obtained.

In this digital photoprinter, the images in the respective frames are continuously read frame by frame with a scanner. The read-out image data is then sequentially transferred to an image processing apparatus and subjected to image processing, and processed image data is then sequentially transferred to a printer and continuously exposed in the sequence it is transferred.

Therefore, in order to realize high productivity, it is preferable that the scanner, image processing apparatus and printer operate at all times and continuously carry out processings without interfering with other units.

For this purpose, the image processing apparatus for the digital photoprinter requires a sufficient processing speed such that the reading of the image by the scanner and the recording of the image by the printer are not stopped. Specifically, the digital photoprinter requires a processing speed which is high enough so that the transfer of the image data from the scanner to the image processing apparatus is not delayed, and so that the printer need not wait for the transfer of the image data from the image processing apparatus. In summary, a higher processing speed is required for the image processing apparatus.

SUMMARY OF THE INVENTION

An object of the present invention is to provide an image processing apparatus capable of continuously receiving image data from a scanner and continuously processing it at a high speed and which is preferably used in an application which requires output of finished prints at a high speed, such as in the case of a digital photoprinter.

In order to achieve the above object, the invention provides an image processing apparatus for subjecting image data which is photoelectrically read out by an image reading apparatus to predetermined image processings and outputting the read-out image data as image data to be recorded, comprising:

a plurality of memories for storing the image data read out by the image reading apparatus;

an image processing unit for reading the image data from said memories and carrying out the predetermined image processings to the thus read image data by a pipeline processing;

a condition setting unit for setting image processing conditions in said image processing unit;

an image data bus for inputting and outputting the image data; and a control bus for inputting and outputting control data.

Preferably, the image processing unit alternately uses the plurality of memories per one frame of an image.

It is preferred that the image processing unit reads the image data per one or more lines among the image data of one frame of an image stored in the memory, and carries out the predetermined image processing of image data of one or more lines by pipeline processing.

It is also preferred that the condition setting unit sets the image processing conditions using prescanned image data which is photoelectrically read out at low resolution by the image reading apparatus.

It is further preferred that the image processing unit carries out the predetermined image processing to fine-scanned image data which is photoelectrically read out at a high resolution after the image processing conditions have been set by a condition setting unit.

It is still further preferred that the image processing unit comprises a color/gradation processing unit for correcting a color and a gradation of an image, a scale convention processing unit for enlarging and reducing the image, a dynamic range processing unit for compressing and expanding a dynamic range of the image data of one frame of the image, and a sharpness processing unit for enhancing a sharpness of the image. Specifically, the color/gradation processing, scale conversion processing, dynamic range processing and sharpness processing are performed by pipeline processing.

Additionally in the present invention, the image processing time of one frame of an image processed by the image processing apparatus is preferably shorter than a time necessary to photoelectrically read out the frame of the image by the image reading unit.

DETAILED DESCRIPTION OF THE INVENTION

A preferred embodiment of an image processing apparatus of the present invention will be described below in detail with reference to accompanying drawings.

Figure 1:
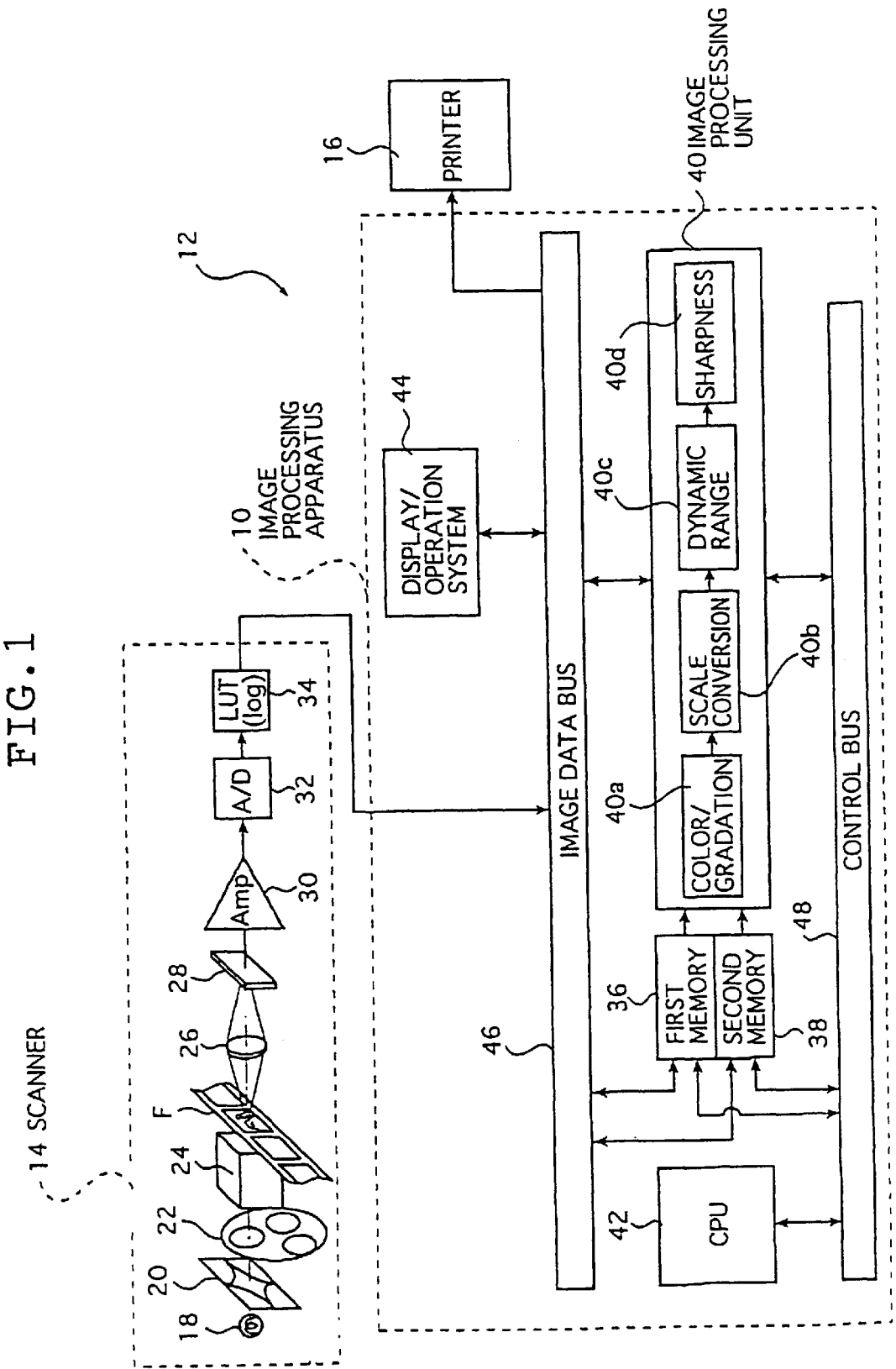
FIG. 1 is a block diagram showing an embodiment of an image processing apparatus of the present invention and an embodiment of a scanner for supplying image data to the image processing apparatus.

FIG. 1 shows a schematic view of a digital photoprinter making use of the image processing apparatus of the present invention.

A digital photoprinter 12 shown in FIG. 1 comprises an image processing apparatus 10 of the present invention, a scanner 14 and a printer 16. The respective frames of the image imaged on a film F or the like are sequentially and photoelectrically read out by the scanner 14. Image data is then output to the image processing apparatus 10, subjected to a predetermined image processing by the image processing apparatus 10, and output to the printer 16. Printer 16 receives the image data for recording on a photosensitive material Z. It then scans and exposes the material Z with a light beam which is modulated in accordance with the image data, develops the material and finally outputs a finished print P.

The scanner 14 which photoelectronically reads out the respective frames of the image imaged on the film F one by one comprises a light source 18, a variable diaphragm 20 and color filter plate 22 having three color filters of R, G, B for decomposing the image imaged on the film F to the three primary colors, i.e., red (R), green (G) and blue (B) and which is capable of causing any arbitrary color filter to act on a light beam path. Scanner 14 further includes a diffusion box 24 for making a reading light beam incident on the film F uniform in the surface direction of the film F, an imaging lens 26, a CCD sensor 28 for reading the frame of the image imaged on the film F, an amplifier 30, an A/D converter 32, and a LUT (look up table) 34 for subjecting a signal to log conversion and making it to a density signal.

In the scanner 14 as described above, reading-out light produced by the light source 18 impinges upon the film F after the amount of light of the reading-out light is adjusted by the variable diaphragm 20, the color thereof is adjusted through the color filter plate 22 and the reading-out light is diffused by the diffusion box 24. When the reading light passes through the film F, a projected light carrying an image recorded on the film F is obtained.

The image of the projected light is formed on the light receiving surface of the CCD sensor 28 by the image forming lens 26 and photoelectrically read out by the CCD sensor 28. Output signals output from the CCD sensor 28 are amplified by the amplifier 30, converted into digital signals by the A/D converter 32, converted into image density signals at the LUT 34 and input to the image processing apparatus 10 as the image data associated with the image recorded on the film F.

The scanner 14 reads out the image recorded on the film F three times by sequentially inserting the red, green and blue filters of the color filter plate 28 and decomposes the image of a frame to the three primary colors of red, green and blue.

Before an image is fine-scanned in order to obtain image data to be output to the printer 16, the image processing apparatus shown in FIG. 1 carries out prescanning for reading out an image at a low resolution to thereby determine the aperture volume of the variable diaphragm 20 and to set image processing conditions. That is, the scanner 14 carries out image reading (image data outputting) by frame a total of six times.

When one of the frames of the image is completely read out, the film F is fed one frame of a time by a feed means (not shown) to a reading position, and remains there to be read until the memory of the image processing apparatus 10 has empty or writable areas. Subsequently, the next frame is read out continuously as described in the above process.

Image processing apparatus 10 is used to subject the image data received from scanner 14 to a predetermined image processing and outputs the processed image data to printer 16, and is used to control and operate the digital photoprinter 12 as a whole. The image processing apparatus 10 comprises a first memory 36, a second memory 38, an image processing unit 40, a CPU 42, a display/operation system 44, an image data bus 46 and a control bus 48.

Although only a single scanner is illustrated in the digital photoprinter 12 of FIG. 1, the number of scanners connected to the image processing apparatus of the present invention are not limited to one. Rather a plurality of scanners may be connected thereto. For example, one scanner can be utilized reading out the image of a printed matter and a photograph while another scanner can be used solely for reading out the film F (light-transmitting original) as shown in FIG. 1.

Further, the number of printers connected to the image processing apparatus 10 is not limited; a plurality of printers may be connected thereto. In addition, other means for recording and storing the image data, such as a HD (hard disk), a photomagnetic recording disk, a floppy disk and the like may be connected to the image processing apparatus 10, such that processed or unprocessed image data may be output thereto.

The first memory 36 and the second memory 38 are fundamentally the same. One frame of the image data received from the scanner 14 is stored in either of the first memory 36 and/or the second memory 38. The alternative use of both memories will be described later in detail.

Additionally, the number of the memories used in the image processing apparatus of the present invention is not limited to the two described; the apparatus may be provided with three or more sets of memories. In addition, the first memory 36 and the second memory 38 may be used as memories dedicated to the fine-scanned image data, or a plurality of memories dedicated to prescanned image data may be separately provided.

The image processing unit 40 reads out the image data stored in the first memory 36 and the second memory 38 and subjects the image data to the image processing to prepare the image data for recording and subsequent printing by the printer 16. The image processing unit 40 is composed of the combination of memories and various types of processing circuits.

In the image processing apparatus 10 of the present invention, the image processing unit 40 carries out the image processing by a pipeline processing and comprises a color/gradation processing unit 40a for correcting the color and the gradation of an image, a scale conversion processing unit 40b for enlarging and reducing the image, a dynamic range processing unit 40c for compressing and expanding the dynamic range of image data and a sharpness processing unit 40d for carrying out sharpness processing (enhancing the edges of the image).

The CPU 42 calculates image processing conditions by making a density histogram and the like from the image data (prescanned image data) stored in the first memory 36 and the second memory 38 and sets the conditions for the image processing unit 40. That is, the image processing by the image processing unit 40 is carried out in accordance with the image processing conditions set by the CPU 42.

Note, in the image processing apparatus of the present invention, the method of setting the image processing conditions is not limited to the method of using the prescanned image data but they may be set using finely scanned data.

The display/operation system 44 includes a display unit, a mouse, a keyboard and the like and carries out the operation of the image processing apparatus 10 as well as the digital photoprinter 12, as a whole, the display of an image and an operating instruction, and the instruction, setting and the like of the verification carried out by the operator and the image processing conditions which are executed when necessary.

The image data bus 46 is a bus for inputting and outputting the image data such as the image data sent from the scanner 14 and the image data processed by the image processing unit 40 and the like. The scanner 14, the first memory 36, the second memory 38, the image processing unit 40, the display/operation system 44 and the printer 16 are connected to the image data bus 46.

On the other hand, the control bus 48 is a bus for inputting and outputting control data and the like. The first memory 36, the second memory 38, the image processing unit 40 and the CPU 42 are connected to the control bus 48.

That is, the image processing apparatus 10 of the present invention includes the image data I/O bus and the control bus which are provided independently of each other.

The image processing apparatus 10 of the present invention can continuously process a plurality of frames of image data at a high speed with a high efficiency by the combination of the plurality of image data memories, the pipeline processing in the image processing unit 40 and the image data bus and the control bus which are provided independently of each other.

Operation of the image processing apparatus 10 will be described below.

When one frame of the image on the film F is read out by the scanner 14, the image data thereof is sequentially transferred to the first memory 36 or the second memory 38, for example, to the first memory 36 and stored therein.

When all the prescanned image data in one frame of the image is stored in the first memory 36, the CPU 42 calculates image processing conditions from the prescanned image data and sets them to the image processing unit 40.

Note, after the image processing conditions are set, an image (prescanned image) processed under the image processing conditions is displayed as required (in accordance with the operation mode selected by the operator) on the display of the display/operation system 44 to thereby permit the operator to make verification and adjustment of the image processing conditions, such as the adjustment of color/density, and the like.

When the image processing conditions are set and all the fine-scanned image data in one frame of the image is stored in the first memory 36, the image processing unit 40 reads the fine-scanned image data of one or more lines in the one frame from the first memory 36 and subjects the image data to pipeline processing.

That is, in the image processing unit 40, the image data of the one or more lines in the one frame to be recorded first by the printer 16, is read and processed by the color/gradation processing unit 40a by being sent thereto and further processed by the scale conversion processing unit 40b, the dynamic range processing unit 40c and the sharpness processing unit 40d by being sequentially sent thereto. On the other hand, when the image processing is finished in the color/gradation processing unit 40a and the image data is output therefrom, the next image data, that is, the image data of the one or more lines in the same frame is read from the first memory 36. Further, as the image data is processed by the respective processing units and output therefrom, the image data is sequentially transferred to the next processing unit and processed there. The image data is sequentially read and sent to the color/gradation processing unit 40a and then finally to the sharpness processing unit 40d through the respective units 40b and 40c, whereby one frame of the image data is sequentially image processed.

Once image data has been subjected to all units of the image processings, it is sequentially output to the image data bus 46 from the image processing unit 40 (sharpness processing unit 40d) and read out by driver 50 of the printer 16.

When one frame of the image is read out by scanner 14, the film F is fed by one frame by feed means so that the next frame (a second frame) is located at the reading position of the scanner 14.

At this time, when second memory 38 is empty or has writable area, scanner 14 begins to read out the image of the next frame continuously as in the above-described process. The image data of the next frame is sequentially stored in second memory 38 and image processing conditions and the like are set similar to the image data of the previous frame. The image data stored in the second memory 38 is read sequentially per one or more lines by the image processing unit 40. After completion of all the processing, which is: (1) the setting of the image processing conditions of the next frame of image data, (2) the recording of the next frame of image data to the second memory 38 and (3) the image processing of the previous frame by image processing unit 40, the image data, is then processed per one or more lines by the pipeline processing.

Further, when first memory 36 becomes empty or has writable data at a point where scanner 14 has completed reading of the image of the frame (second frame) scanner 14 begins to read out the next frame (third frame).

According to the image processing apparatus 10 of the present invention, since the image memories for a plurality of frames are alternately used, the image processing can be carried out simultaneously with the storing of the image data having been transferred (the reading out of the image by the scanner 14). Thus, an image can be effectively read out by scanner 14 without waiting for image data of the previous frame to be processed.

Moreover, since the image processing apparatus 10 of the present invention performs pipeline processing through the image processing unit 40, and since it is provided with independent buses for the image data and the control data, processing can be performed at a very high speed. Specifically, the time at which the image data of one frame is stored in the first memory 36 and the second memory 38 to the time at which all of the image data of the frame is read or eliminated is very short. Consequently, processing time of the image data of one frame can be made shorter than a time necessary to photoelectrically read out one frame of the image, although this time depends on the performance of a device.

Therefore, since the present invention includes the combination of a plurality of image data memories, pipeline processing in an image processing unit 40, and an image data bus and control bus which are independent of each other, the image processing apparatus 10 can sequentially receive image data having been continuously read out by the scanner 14, sequentially process the image data a high speed, and continuously output the image data so that processing can be carried out very effectively at high speed.

As a result, the image processing apparatus 10 of the present invention permits the scanner 14 to continuously read out images and the printer 16 to continuously record images, so that finished prints P can be output effectively at a very high speed.

As described above, the output image data which has been output to the image data bus 46 and subjected to image processing is read out by the driver 50 of the printer 16 and subjected to D/A conversion.

Figure 2:
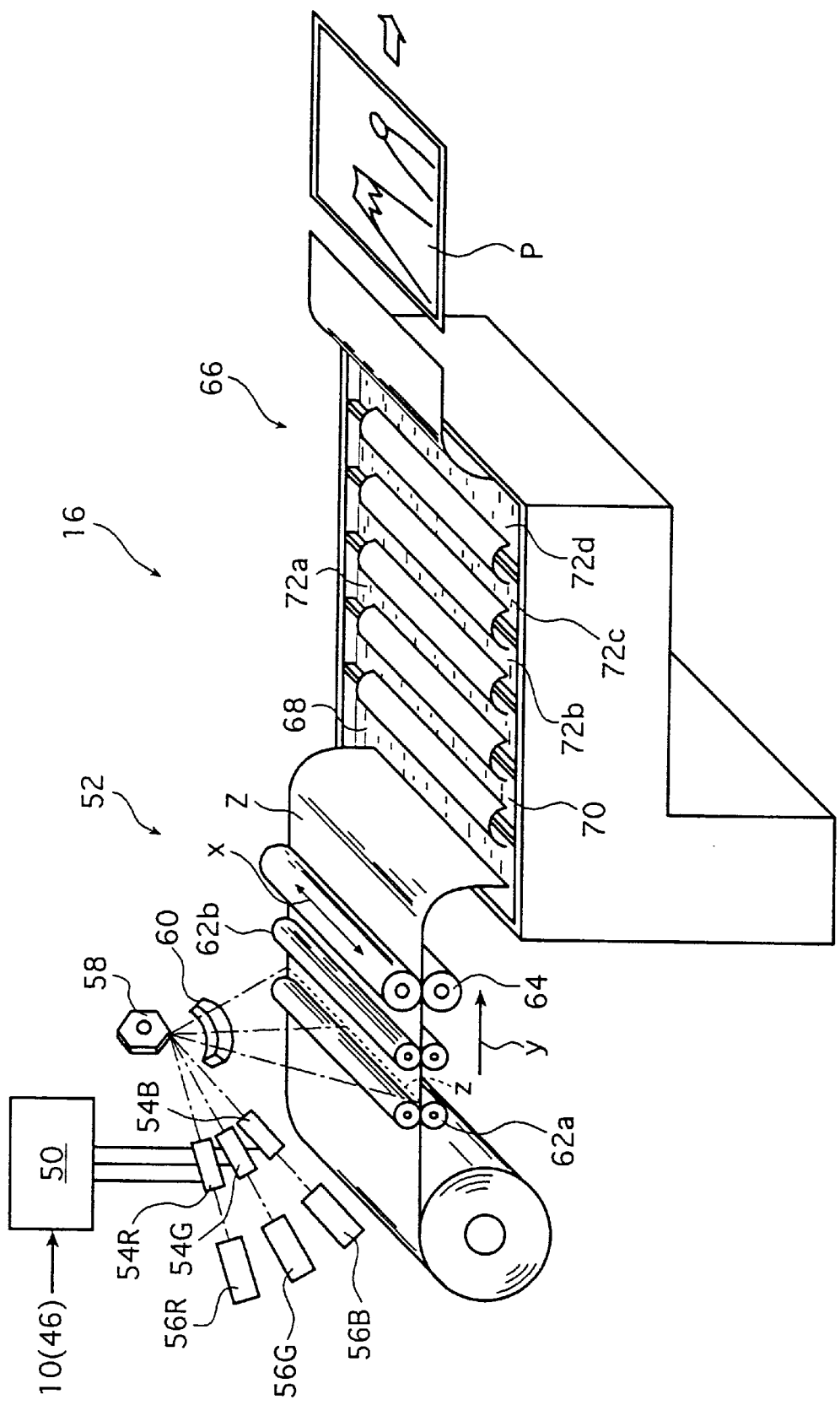
FIG. 2 is a conceptual view of a printer to which the image processing apparatus of the present invention shown in FIG. 1 outputs image data.

Referring to FIG. 2, the driver 50 drives acoustic optical modulator (AOM) 54 of an image exposing unit 52 so that a light beam is modulated in accordance with the image data subjected to D/A conversion.

The image exposing unit 52 records the image of the above image data to a photosensitive material Z by scanning and exposing the photosensitive material Z with a light beam scan. As conceptually shown in FIG. 2, the image exposing unit 52 includes a light source 56R for emitting a light beam having a narrow bandwidth region corresponding to the exposure of an R photosensitive layer formed to the photosensitive material Z, a light source 56G which corresponds to the exposure of a G photosensitive layer and a light source 56B corresponding to the exposure of a B photosensitive layer, AOMs 54R, 54G and 54B, which modulate the light beams emitted from the respective light sources in accordance with the respective recorded images, a polygon mirror 58 for use as a light deflector, a fθ lens 60 and an auxiliary scanning means for photosensitive material Z.

The light beams emitted from the light sources 56 (56R, 56G, 56B) each travel at a different angle and are incident on the AOMs 54 (54R, 54G, 54B) which correspond thereto. Driving signals of R, G, B which correspond to the recorded image, are transferred from the driver 50 to the respective AOMs 54, thereby subjecting the incident light beams intensity modulation in accordance with the recorded image.

The modulated light beams are incident on the polygon mirror 58 at approximately the same points thereof, reflected thereat, and deflected in a main scanning direction (the direction of an arrow x in the drawing). The beams are then adjusted by the fθ lens 60 so as to be imaged at a predetermined scanning position z in a predetermined beam shape and incident on the photosensitive material Z. Note, light beam shaping means and an optical system for correcting the tilt of the reflecting surfaces of the polygon mirror 58 may be included in the image exposing unit 52 if necessary. Once, the light beams are adjusted by fθ lens 60, the photosensitive material Z is rolled in a shaded state as shown in FIG. 2.

The photosensitive material Z is subsequently drawn out by a drawing roller (not shown), and fed and scanned in an auxiliary scanning direction (in the direction of an arrow y in the drawing) which is perpendicular to a main scanning direction by pairs of feed rollers 62a, 62b which are disposed on opposite sides of a scanning position z.

Since the light beams are deflected in the main scanning direction, the entire surface of the photosensitive material Z is two-dimensionally scanned and exposed by the light beams, so that the image (latent image) of the image data having been transferred from the light source 18 is recorded onto the photosensitive material Z.

Next, the exposed photosensitive material Z is fed to a developing unit 66 by a pair of feed rollers 64 and made into a finished print P.

Where the photosensitive material Z is a silver salt photosensitive material, the developing unit 66 comprises a color developing bath 68, a bleaching/fixing bath 70, washing baths 72a, 72b, 72c and 72d, a drier and a cutter (not shown). The photosensitive material Z is subjected to predetermined processings in the respective baths, dried, and then cut to a predetermined length corresponding to a print, and output.

On the foregoing pages, the image processing apparatus of the present invention has been described in detail but is in no way limited to the stated embodiments. Various improvements and modifications can of course be made without departing from the spirit and scope of the invention.

As described above in detail, according to the image processing apparatus of the present invention, since image data can be continuously received from the scanner, processed at a high speed and output, the image processing apparatus permits the scanner to continuously read out images and the printer to continuously record the images in an application which requires the output of finished prints at a high speed, as in the case of a digital photoprinter. Thus, finished prints can be output effectively at a high speed.

What is claimed is:

1. An image processing device for subjecting photo-electrically read-out image data received from an image reading unit to a predetermined image processing and for recording the read-out image data, comprising:

a plurality of memories for storing the image data read out by the image reading unit;

an image processing unit for reading the image data from said memories, wherein the image processing unit reads one or more lines of image data from a single frame of an image stored in said plurality of memories to perform predetermined processing of said one or more lines of image data by pipeline processing;

a condition setting unit for setting image processing conditions in said image processing unit;

an image data bus for inputting and outputting the image data; and a control bus for inputting and outputting control data, wherein the image processing unit and the plurality of memories provide for simultaneous reading out and image processing of image data, due to the image processing unit reading one or more lines of image data from a single frame of an image stored in said plurality of memories, and due to at least one of said plurality of memories having an empty or writeable area to receive a subsequent frame of image data from the image reading unit.

2. An image processing device according to claim 1, wherein said image processing unit alternates using the plurality of memories for each single frame of an image.

3. An image processing device according to claim 1, wherein the condition setting unit sets image processing conditions using pre-scanned image data photo-electrically read out at low resolution by the image reading unit.

4. An image processing device according to claim 1, wherein the image processing unit performs predetermined image processing on fine-scanned image data photo-electrically read out at high resolution after the image processing conditions have been set by the condition setting unit.

5. An image processing device according to claim 1, wherein the image processing unit further includes a color/gradation processing unit for correcting color and gradation of an image, a scale conversion processing unit for enlarging and reducing the image, a dynamic range processing unit for compressing and expanding a dynamic range of the image data of a single frame of the image, and a sharpness processing unit for enhancing sharpness of the image.

6. An image processing device, comprising:

a plurality of memories for storing image data read out by an image reading unit;

an image processing unit for reading the image data from said memories, wherein the image processing unit reads one or more lines of image data from a single frame of an image stored in said plurality of memories to perform predetermined processing of said one or more lines of image data by a pipeline operation; and an image data bus for inputting image data to the image processing unit and for outputting the image data to a recorder, wherein the image processing unit and the plurality of memories provide for simultaneous reading out and image processing of image data, due to the image processing unit reading one or more lines of image data from a single frame of an image stored in said plurality of memories, and due to at least one of said plurality of memories having an empty or writeable area to receive a subsequent frame of image data from the image reading unit, thereby enabling high speed recording.

7. An image processing device according to claim 6, further comprising a condition setting unit for setting image processing conditions in said image processing unit.

8. An image processing device according to claim 7, wherein the condition setting unit sets image processing conditions using pre-scanned image data which is photo-electrically read out by the image reading unit.

9. An image processing device according to claim 6, wherein the image processing unit alternates using the plurality of memories for each single frame of an image.

10. An image processing device according to claim 7, wherein the image processing unit performs predetermined image processing on fine-scanned image data which is photo-electrically read out at high resolution after the image processing conditions have been set by the condition setting unit.

11. An image processing device according to claim 6, wherein the image processing unit further includes a color/gradation processing unit for correcting color and gradation of an image, a scale conversion processing unit for enlarging and reducing the image, a dynamic range processing unit for compressing and expanding a dynamic range of the image data of a single frame of the image, and a sharpness processing unit for enhancing sharpness of the image.

12. An image processing device according to claim 11, wherein the image processing unit performs each of the color/gradation processing, scale conversion processing, dynamic range processing and sharpness processing by a pipeline operation.

13. An image processing device according to claim 5, wherein the image processing unit performs each of the color/gradation processing, scale conversion processing, dynamic range processing and sharpness processing by a pipeline operation.

14. A method of image processing, comprising:

reading image data from an image reading unit into a plurality of storage memories;

processing the image data stored in said memories with an image processing unit, wherein the image processing unit reads one or more lines of image data from a single frame of an image stored in said plurality of memories to perform predetermined processing of said one or more lines of image data by a pipeline operation; and outputting the image data processed in the image processing unit to a recorder, wherein the image processing unit and the plurality of memories provide for simultaneous reading out and image processing of image data, due to the image processing unit reading one or more lines of image data from a single frame of an image stored in said plurality of memories, and due to at least one of said plurality of memories having an empty or writeable area to receive a subsequent frame of image data from the image reading unit, thereby enabling high speed recording.

15. The method according to claim 14, further comprising the step of setting image processing conditions in the image processing unit with a condition setting unit.

16. The method according to claim 15, wherein the step of setting image processing conditions further comprises using pre-scanned image data which is photo-electrically read out at low resolution by the image reading unit.

17. The method according to claim 15, wherein the step of processing further comprises performing predetermined image processing on fine-scanned image data which is photo-electrically read out at high resolution after the image processing conditions have been set by the condition setting unit.

18. The method according to claim 14, wherein the step of processing further includes:

correcting color and gradation of an image with a color/gradation processing unit;

enlarging or reducing the image with a scale conversion processing unit;

compressing and expanding a dynamic range of the image data in a single frame of the image with a dynamic range processing unit; and enhancing sharpness of the image with a sharpness processing unit.

19. The method according to claim 18, wherein the steps of correcting color and gradation of an image, enlarging an reducing the image, compressing and expanding a dynamic range of the image and enhancing sharpness of the image are performed by a pipeline operation within the image processing unit.

* * * * *